United States Patent [19]

Obländer et al.

[11] Patent Number: 4,620,448
[45] Date of Patent: Nov. 4, 1986

[54] ARRANGEMENT FOR MEASURING THE RATE OF FLOW OF A GASEOUS OR LIQUID MEDIUM THROUGH A HOUSING

[75] Inventors: Kurt Obländer, Kernen; Jörg Abthoff, Plüderhausen; Hans-Dieter Schuster, Schorndorf; Karlwalter Schmidt, Weinstadt, all of Fed. Rep. of Germany

[73] Assignee: Daimler-Benz Aktiengesellschaft, Fed. Rep. of Germany

[21] Appl. No.: 715,247

[22] Filed: Mar. 25, 1985

[30] Foreign Application Priority Data

Mar. 24, 1984 [DE] Fed. Rep. of Germany ....... 3410991

[51] Int. Cl.$^4$ ............................................... G01F 1/28
[52] U.S. Cl. ................................. 73/861.71; 73/861.76
[58] Field of Search ........... 73/861.71, 861.74, 861.75, 73/861.76, 118

[56] References Cited

U.S. PATENT DOCUMENTS

| | | | | |
|---|---|---|---|---|
| 1,619,416 | 3/1927 | Graemiger | ....................... | 73/861.75 |
| 2,632,329 | 3/1953 | Zuehlke | ........................... | 73/861.74 |
| 3,530,714 | 9/1970 | Akeley | ............................. | 73/861.75 |
| 3,857,277 | 12/1974 | Moore | ............................... | 73/861.74 |
| 3,971,253 | 7/1976 | Hini et al. | ........................ | 73/861.74 |
| 4,530,334 | 7/1985 | Pagdin | ............................. | 73/861.76 |

FOREIGN PATENT DOCUMENTS

| | | |
|---|---|---|
| 133693 | 6/1901 | Fed. Rep. of Germany . |
| 941334 | 4/1956 | Fed. Rep. of Germany . |
| 1249548 | 12/1962 | Fed. Rep. of Germany . |
| 1548932 | 10/1969 | Fed. Rep. of Germany . |
| 2246546 | 9/1972 | Fed. Rep. of Germany . |
| 3044219 | 6/1982 | Fed. Rep. of Germany . |
| 72613 | 4/1902 | France . |
| 1128158 | 1/1957 | France . |

Primary Examiner—Herbert Goldstein
Attorney, Agent, or Firm—Barnes & Thornburg

[57] ABSTRACT

A measuring device that is moved corresponding to the amount of medium flowing through a housing is provided for measuring the flow rate of a gaseous or liquid medium through the housing. The displacement of the measuring device represents a measurement of the amount of medium flowing through the housing and during the displacement of which, a movable part of a control valve is adjusted for metering a control medium volume that is proportional to the flow of medium in the housing. The measuring means is pivotably mounted at an upstream end to the housing and, at a downstream end, rests against the wall of the housing in its closed position. In order to provide an arrangement that is simple to manufacture and is not susceptible to momentary disturbances and which records the measured values exactly, the measuring means comprises a concavely shaped leaf spring which interacts with the flow of medium.

22 Claims, 3 Drawing Figures

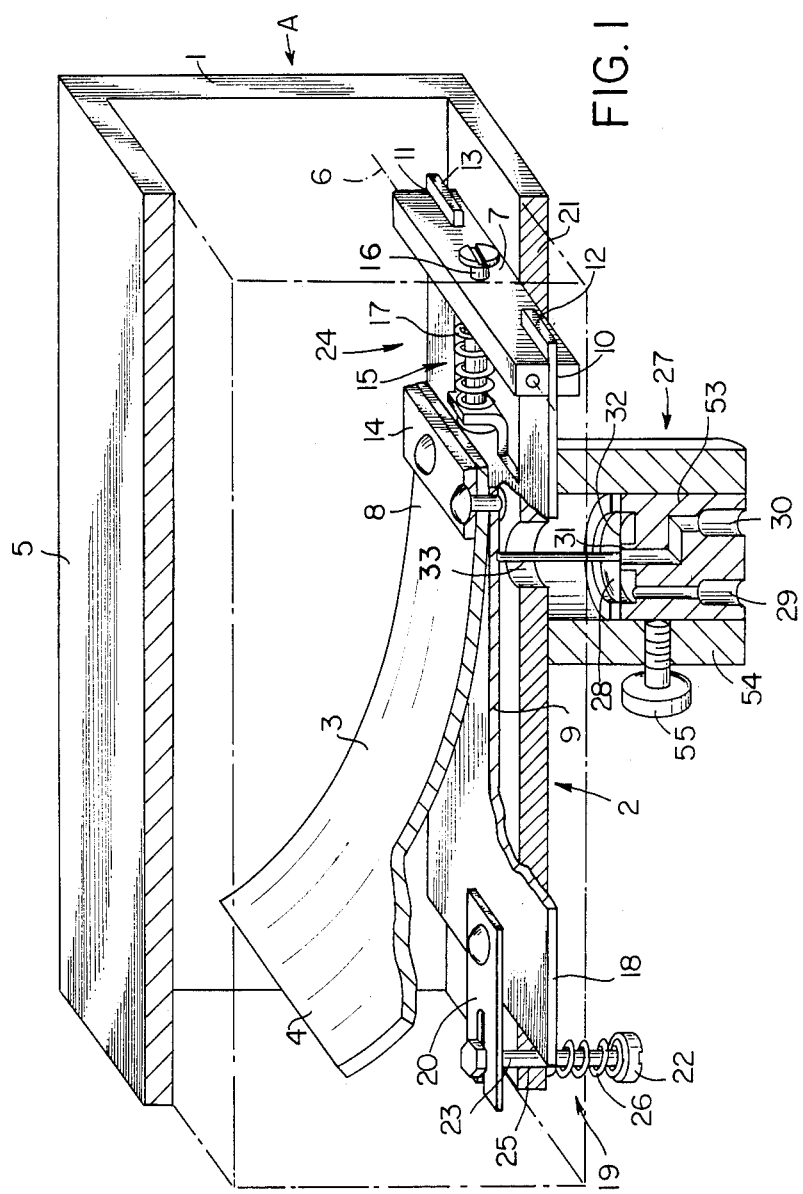

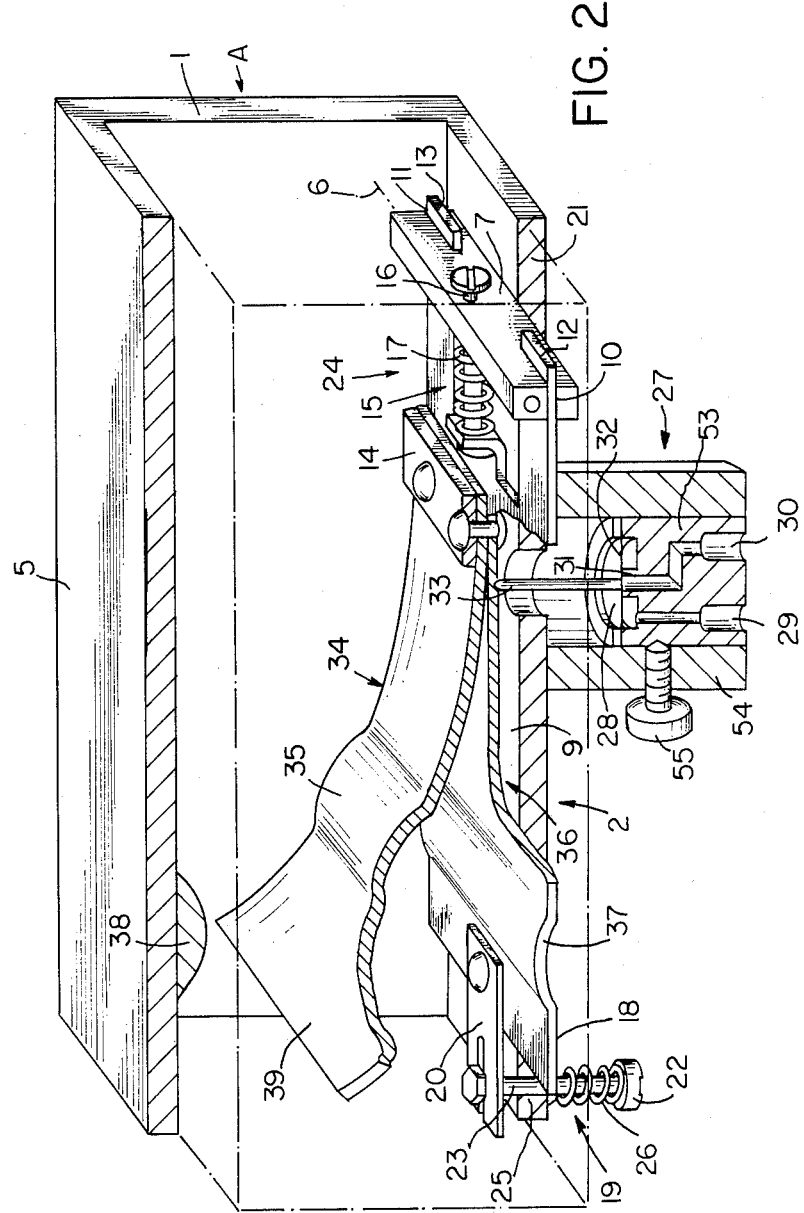

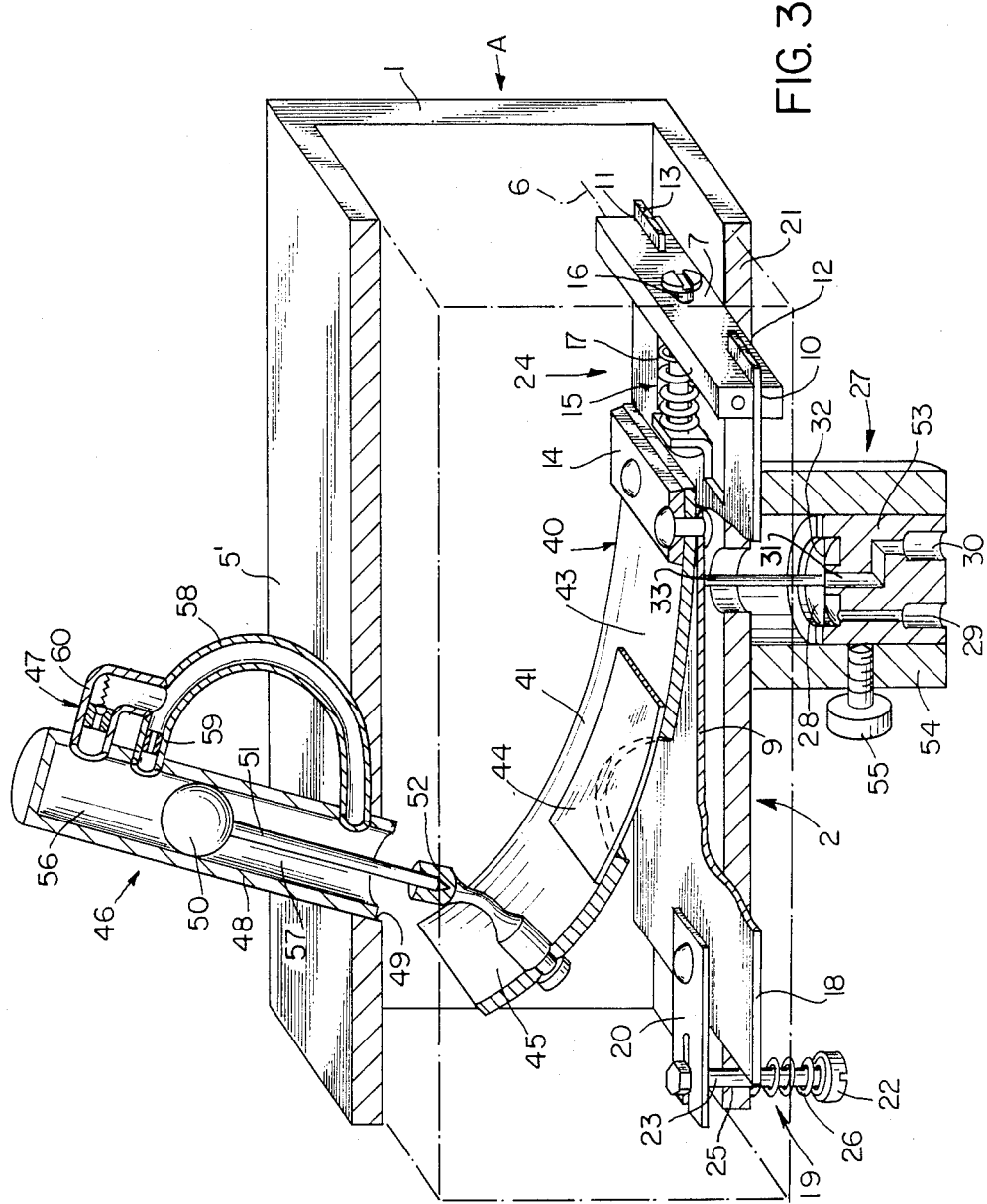

ARRANGEMENT FOR MEASURING THE RATE OF FLOW OF A GASEOUS OR LIQUID MEDIUM THROUGH A HOUSING

BACKGROUND AND SUMMARY OF THE INVENTION

This invention relates in general to an arrangement for measuring the rate of flow of a gaseous or liquid medium through a housing and, in particular to an arrangement for measuring the volume of air flowing through the intake pipe of an internal combustion engine.

In German Patent Publication DE-OS No. 22 46 546, an air measuring means is known for a fuel supply system of a mixture compressing, spark ignition, internal-combustion engine having an air-intake pipe in which the air measuring means is arranged. In correspondance to the amount of air flowing through the intake pipe, the air measuring means is moved against a restoring force. The displacement of said air measuring means represents a measurement of the amount of air taken in. The air measuring means, on one side, is disposed so that it can be rotated around a fixed bearing shaft arranged transversely in the air intake pipe and takes the form of an air flap transversely arranged in the air intake pipe. The air flap is swivelled against the force of a restoring spring. A particular problem with this arrangement has been the bearing arrangement for the air flap. In order to achieve an exact transmission of information, this bearing would have to be almost without friction. However, this can be achieved only by means of considerable manufacturing costs and results in a significant susceptibility to momentary disturbances.

It is an objective of this invention to provide an arrangement of the above type for measuring the rate of flow of a gaseous or liquid medium through a housing, which can be manufactured by simple means, is not susceptible to disturbances and is able to precisely record the measured values.

The above and other objects are attained in an arrangement for measuring flow of a fluid medium through a housing, comprising air measuring means arranged in the housing, the measuring means being movable in response to a flow of medium in the housing. Displacement of the measuring means is representative of the amount of medium flowing through the housing. The arrangement also comprises a control valve, arranged in a control pipe adjacent to the housing, for metering a control medium in proportion to the amount of medium flowing through the housing. The control valve has a movable part which interacts with and is responsive to the displacement of the air measuring means. The air measuring means comprises a leaf spring pivotably mounted adjacent a first wall of the housing at an upstream end of the leaf spring, and having a downstream end which rests against a second wall of the housing when the measuring means is in a closed position. In a preferred embodiment, the leaf spring is concavely shaped relative to the flow direction of the medium. In an especially preferred embodiment, the leaf spring has a wave or step-shaped deformation extending transversely to the flow direction of the medium.

The measuring means further includes a shaft body disposed transversely to the flow direction of the medium and rotatably mounted to the housing. The shaft body includes adjustment means for adjusting the measuring means in the flow direction of the medium.

In a preferred embodiment, the leaf spring is rigidly attached to a support plate. The support plate can be adjusted by the adjustment means of the shaft body in the flow direction of the medium. The support plate has guide bars which are guided in guiding slots in the shaft body, and an adjustment stop which interacts with the adjustment means of the shaft body. The adjustment means of the shaft body preferably comprises a screw arrangement connecting the shaft body and the adjustment stop. The screw arrangement comprises a screw and a coaxially arranged spring. In the illustrated embodiment of the invention, the support plate interacts with the movable part of the control valve. The leaf spring is attached to the support plate in the area of the shaft body.

The preferred embodiment of the invention further comprises a setting device for adjusting the support plate vertically with respect to a flow direction of the medium. The setting device comprises a threaded connection between the support plate and the housing. The threaded connection includes a screw bolt and a compression spring coaxially arranged on the screw bolt between a head of the screw bolt and the housing. The setting device is preferably connected to the support plate by a spring.

In a preferred embodiment of the invention, the leaf spring has at least one cross-section reducing recess which can be closed by an elastic covering fastened on one side to a side of the leaf spring which faces the approaching medium.

Another preferred embodiment of the invention includes a damping device which comprises a cylinder closed on one end and equipped with a spring loaded return valve. The cylinder is fastened to the housing at its open end. A damping ball is guided within the cylinder and is connected by a connecting rod to an elastic joint fastened to the leaf spring. The damping device includes a connecting pipe which connects the space in the cylinder located above the damping ball with the space in the cylinder located below the damping ball. A throttle is preferably disposed in the connecting pipe to further control the damping function. The connecting pipe is connected at a point downstream from the throttle with the space of the cylinder located above the damping ball by a short circuit line in which the spring loaded return valve is located. This arrangement reduces the damping in one direction.

The leaf spring is preferably made from a bimetal strip.

Other features of the invention include a contoured protruberance located in the housing and acted upon by the medium. The contoured protruberance is located on the housing in the area of the downstream end of the leaf spring. In a preferred embodiment, the support plate has a wave or step-shaped deformation extending transversely to the flow direction of the medium.

The arrangement according to the invention can be used for liquids and for gases and can function in any installed position. Because of the small mass of the leaf spring, a rapid recording of measured values is possible. The arrangement requires little space and has a low weight. The basic adjustment and the characteristic curve of the arrangement can be modified easily and flow losses are low.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a longitudinal section through the arrangement with an undamped leaf spring;

FIG. 2 is a perspective view of a longitudinal section through the arrangement in another embodiment;

FIG. 3 is a perspective view of a longitudinal section through the arrangement with a damped leaf spring.

DETAILED DESCRIPTION OF THE DRAWINGS

Reference number 1 in FIG. 1 is a housing through which a gaseous or liquid medium flows in the direction of the Arrow A. In the housing 1, a measuring means 2 is arranged comprising a leaf spring 3 which interacts with the approaching medium. As viewed from the direction from which the medium approaches, leaf spring 3 has a concave shape and, in the inoperative position, rests with the front edge of its end area 4 against the upper wall 5 of the housing 1 so that the flow path through the housing is blocked. The measuring means 2 also comprises a shaft body 7 positioned transversely to the approaching direction of the medium and disposed in the housing 1 so that it can be rotated around a shaft having an axis 6. At its end area 8, leaf spring 3 is rigidly attached (for example, by means of riveting) to a support plate 9 in the area of the shaft body 7. Support plate 9 has guide bars 12 and 13 positioned in guide slots 10 and 11 of shaft body 7 as well as an adjustment stop 14. Support plate 9 can be adjusted by means of an adjusting device 15 in the approaching direction of the medium. Adjusting device 15 comprises a screwed connection 24 connecting the shaft body 7 and the adjustment stop 14 as well as a pressure spring 17 coaxially arranged on the screw bolt 16 between the adjustment stop 14 and the shaft body 7. The end 18 of the support plate 9 farthest away from the shaft body 7 can be adjusted by means of a setting device 19 vertically with respect to the approaching direction of the medium. The setting device 19 is formed by a screwed connection 25 connecting a spring 20, which is preferably a leaf spring, fastened (for example, by means of riveting) to the support plate 9, and to the lower wall 21 of the housing 1. A compression spring 26 is compressed and arranged coaxially on a screw bolt 23 between the screw head 22 of the screw bolt 23 of the screwed connection 25 and the wall 21. Via spring 20, a torque which can be adjusted by setting device 19 is applied around the axis 6. At the exterior side of the lower wall 21 of the housing 1, a known control valve 27 is arranged by means of which a control pressure is set that is a function of the amount of medium flowing through the housing 1. The control valve 27 comprises a control housing 53 having a control space 28 to which gaseous or liquid control medium is supplied through an inflow pipe 29 and from which control medium is discharged through an outflow pipe 30. An outflow connection piece 31 of the outflow pipe 30 interacts with a membrance 32, the position of which controls the outflow cross-section of the outflow connection piece 31 to control the control pressure of the control medium. The position of the membrane 32 is determined by a tappet 33 which interacts with the support plate 9 and is adjusted in correspondance to the displacement of leaf spring 3. The control housing 53 is longitudinally slidably arranged in a guide housing 54 fastened to the wall 21 and can be fixed by means of an adjusting screw 55. Leaf spring 3 is advantageously made of a bimetal strip. In order to avoid a leaking of medium, a sealing means that is not shown may be arranged between the shaft body 7 and the wall 21.

When the gaseous or liquid medium flows in the direction of Arrow A, leaf spring 3 moves in the direction of the support plate 9 sufficiently to establish a balance between the increasing resistance developed by leaf spring 3 and the force of the approaching medium. The displacement of leaf spring 3 causes a swivelling of the support plate 9 around the axis 6 in the direction of the lower wall 21 of the housing 1, by means of which the position of the tappet 33 is changed and thus the outflow cross-section of the outflow connection piece 31 is decreased so that the pressure in the supply pipe 29 is increased. If the displacement of the leaf spring is reduced because of a small amount of approaching medium, the support plate 9 swivels toward the upper wall 5 of the housing 1. Due to the pressure of the control medium on the membrane 32, tappet 33 follows the support plate 9 and the outflow cross-section of the outflow connection piece 31 is enlarged so that the pressure in the supply line 29 is reduced.

The embodiment of the invention shown in FIG. 2 differs from that of FIG. 1 only by the fact that leaf spring 34 has a wave or step-shaped deformation 35 extending transversely to the approaching direction of the medium, and a support plate 36 has a step-shaped deformation 37 extending transversely to the approaching direction of the medium, and the upper wall 5 of the housing 1 is provided with a contoured protruberance 38 acted upon by the approaching medium. The contoured protruberance 38 is positioned in the area of the end 39 of leaf spring 34 farthest away from the shaft body 7.

In the embodiment shown in FIG. 3, a leaf spring 40, in its approximately central area 41, has at least one cross-section-decreasing recess 42 of an arbitrary shape and arrangement which can be closed by an elastic covering 44 fastened on one side to side 43 of leaf spring 40 which faces the approaching medium. Leaf spring 40 interacts with a damping device 46. The damping device 46 comprises a cylinder 48 that is closed on all sides and arranged in a receiving opening 49 in the upper wall 5' of the housing 1 in such a way that it is open in the direction of the space of the housing 1 through which the medium flows. A damping ball 50 is guided in the cylinder 48 which, by means of a connecting rod 51, is connected with an elastic joint 52 fastened on leaf spring 40. The space 56 of the cylinder 48 located above the damping ball 50 and the space 57 of the cylinder 48 located below the damping ball 50 are connected to one another by means of a connecting pipe 58 in which a throttle 59 is arranged. At the same time, the space 56 disposed above the damping ball 50, downstream from the throttle 59, is connected with the connecting pipe 58 by means of a short-circuit line 60 in which a spring-loaded return valve 47 is arranged. A damping of the movement of the damping ball 50, and thus also of the leaf spring 40, takes place due to the fact that the medium is pressed through the gap between the circumferential surface of the damping ball 50 and the inner circumference of the cylinder 48 as well as through the throttle 59. The degree of damping is determined by the size of the gap and by the size of the throttle 59. By means of the return valve 47, the damping is reduced in one moving direction. In the embodiment shown, the damping is reduced when leaf spring 40 moves in the direction of the wall 5'. In the case of an uneven flow through the housing 1 near the frequency of the natural frequency of leaf spring 40, its oscillations are reduced by the damping device 46. The return valve 47 causes a displacement of leaf spring 40 with respect to the center of oscillation. This can be used for balancing the relationship between the amount of medium flowing through the housing 1 and the pressure in the inflow pipe 29.

The cross-section-reducing recess 42 can influence the section modulus of leaf spring 40 and thus the magnitude of the effect on tappet 33. This result can alternatively be achieved by reducing the cross-section by a reduction of the height of leaf spring 40. By means of the elastic covering 44, the recess 42 is exposed when the medium flows back through the housing 1 against the direction of the Arrow A, avoiding a deformation of leaf spring 40.

In the arrangement according to this invention, the relationship between the amount of medium flowing through the housing 1 and the pressure in the inflow pipe 29 can be affected in various ways. For example, the stiffness of the leaf spring, the shape of the support plate, the effective length of the leaf spring that can be varied by the adjusting device 15, the position of the control piston 33 through the adjusting screw 55, the prestressing of the leaf spring 20, the length of the leaf spring, the width of the housing 1, the lateral air gaps between the leaf spring and the housing 1 and the contoured protuberance 38 can all affect the operation of the measuring device. By coordination of the influential parameters, an often preferred linear relationship between the measured quantity and the measuring signal can be achieved. Alternatively, degressive or progressive relationships may be developed. In the case of leaf spring 34 and support plate 36 (FIG. 2), a relationship is created wherein the change is not constant. The torque around the axis 6 may also be changed into a modulated electric signal. The control valve 27 may be replaced by a quartz pressure transducer, a piezoelectric effect transducer, a capacitive transducer, or an inductive transducer. At the tappet 33, the supporting force can be measured by means of stretch-measuring tape. This technique can also be used with the support plate or the leaf spring itself. In addition, it is possible to measure the torque around the axis 6 in various ways at the same time as these other measurements are made. For example, a piezoelectric transducer can be placed at the axis 6 as well as at control valve 27. The bearing force existing there and the change of distance between the leaf spring and the support plate can be measured at the same time via the measuring tape on the support plate or by a capacitive or inductive transducer.

In a preferred embodiment of the invention, the arrangement for measuring the rate of flow is used for a fuel injection system of a mixture-compressing, spark ignition, internal-combustion engine with continuous fuel injection into the intake pipe. In this case, the leaf spring 40 correspoonds to the baffle disk, and the pressure modulated by the control valve 27 corresponds to the displacement of the baffle disk. This displacement is mechanically transferred to the fuel volume divider, as it is known, for example, from "Bosch, Technische Unterrichtung Benzineinspritzung K-Jetronic (Technical Instructions, Fuel Injection K-Jetronic), 1st Edition, February 1974".

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

We claim:

1. an arrangement for measuring the rate of flow of a gaseous or liquid medium through a housing, such as an intake pipe for an internal-combustion engine, comprising:

fluid measuring means, movably disposed in the housing and displaceable in proportion to an amount of medium flowing through the housing, said measuring means extending in the flow direction of the medium and being pivotably mounted to the housing at an upstream end adjacent to a first wall of the housing, and wherein said measuring means includes a leaf spring having an upstream end adjacent said first wall and a downstream free end adjacent an opposing second wall of the housing when said measuring means is in a closed position, whereby the flowing medium acts on the leaf spring to cause rotation of said measuring means; and control valve means, arranged in a control pipe adjacent said housing for metering a control medium in proportion to the amount of medium flowing through the housing, said valve means having a movable part in operable contact with said fluid measuring means and being responsive to displacement of said fluid measuring means, to control metering of the control medium.

2. An arrangement according to claim 1, wherein the leaf spring is concavely shaped relative to a flow direction of the medium.

3. An arrangement according to claim 2, wherein the leaf spring has a wave or step-shaped deformation extending transversely to the flow direction of the medium.

4. An arrangement according to claim 1, wherein the measuring means includes a shaft body disposed transversely to a flow direction of the medium and rotatably mounted to the housing, said shaft body having adjustment means for adjusting the measuring means in a flow direction of the medium to change the operable relationship between said measuring means and the movable part of the control valve means.

5. An arrangement according to claim 1, wherein said measuring means comprises a support plate and wherein the upstream end of the leaf spring is attached to the support plate.

6. An arrangement according to claim 5, wherein the support plate can be adjusted by adjustment means in a flow direction of the medium to change the operable relationship between said measuring means and the movable part of the control valve means.

7. An arrangement according to claim 5, wherein the support plate has guide bars guided in guiding slots of a shaft body and an adjustment stop interacting with the adjustment device.

8. An arrangement according to claim 6, wherein the support plate has guide bars guided in guiding slots of a shaft body and an adjustment stop interacting with the adjustment means.

9. An arrangement according to claim 7, wherein the adjustment means comprises screw means connecting the shaft body and the adjustment stop and wherein said screw means comprises a screw bolt and a coaxially arranged spring connecting the shaft body and the adjusting stop.

10. An arrangement according to claim 5, wherein the support plate interacts with the movable part of the control valve means.

11. An arrangement according to claim 5, wherein the leaf spring is attached to the support plate in the area of a shaft body.

12. An arrangement according to claim 5, comprising a setting device for adjusting the support plate vertically with respect to a flow direction of the medium.

13. An arrangement according to claim 12, wherein the setting device comprises a threaded connection means, connecting the support plate and the housing, wherein said threaded connection means comprises a screw bolt and a compression spring arranged coaxially on the screw bolt between a screw head of the screw bolt and the housing.

14. An arrangement according to claim 12, wherein the setting device is connected to the support plate by a spring.

15. An arrangement according to claim 1, wherein the leaf spring has at least one cross-section-reducing recess which can be closed by an elastic covering fastened on one side to a side of the leaf spring which faces the approaching medium.

16. An arrangement according to claim 1, wherein the leaf spring interacts with a damping device attached to the housing.

17. An arrangement according to claim 16, wherein the damping device includes a cylinder which is closed on one end and which is equipped with a spring-loaded return valve, and which is fastened to the housing, a damping ball being guided in said cylinder, said damping ball being connected by means of a connecting rod to an elastic joint fastened to the leaf spring.

18. An arrangement according to claim 17, wherein the damping device includes a connecting pipe connecting a space of the cylinder located above the damping ball (50) with a space of the cylinder located below the damping ball, and wherein a throttle is disposed in said connecting pipe.

19. An arrangement according to claims 18, wherein the connecting pipe is connected downstream from the throttle with the space of the cylinder located above the damping ball by means of a short-circuit line in which the spring-loaded return valve is disposed.

20. An arrangement according to claim 1, wherein the leaf spring is made of a bimetal strip.

21. An arrangement according to claim 1, wherein the housing has a contoured protruberance acted upon by the medium, said contoured protruberance being arranged in the area of the downstream end of the leaf spring.

22. An arrangement according to claim 5, wherein the support plate has a wave or step-shaped deformation extending transversely to a flow direction of the medium.

* * * * *